United States Patent
Saint-Hilaire et al.

[11] Patent Number: 6,164,263
[45] Date of Patent: Dec. 26, 2000

[54] QUASITURBINE ZERO VIBRATION-CONTINUOUS COMBUSTION ROTARY ENGINE COMPRESSOR OR PUMP

[76] Inventors: Roxan Saint-Hilaire; Ylian Saint-Hilaire; Gilles Saint-Hilaire; Francoise Saint-Hilaire, all of Condo 2804, 3535 Papineau, Montréal, QC, Canada, H2K 4J9

[21] Appl. No.: 08/982,515

[22] Filed: Dec. 2, 1997

[51] Int. Cl.$^7$ .................................................. F02B 53/00
[52] U.S. Cl. ........................................... 123/241; 418/270
[58] Field of Search ............................ 123/241; 418/270

[56] References Cited

U.S. PATENT DOCUMENTS

| | | |
|---|---|---|
| 3,228,183 | 1/1966 | Feller . |
| 3,442,257 | 5/1969 | Walker ..................................... 123/241 |
| 3,614,277 | 10/1971 | Kobayashi .............................. 418/270 |
| 3,933,131 | 1/1976 | Smith . |
| 3,996,899 | 12/1976 | Partner . |
| 4,068,985 | 1/1978 | Baer . |
| 4,144,866 | 3/1979 | Hakner ..................................... 123/241 |
| 4,308,002 | 12/1981 | Di Stefano . |
| 4,434,757 | 3/1984 | Walker ..................................... 123/241 |
| 4,548,171 | 10/1985 | Larson . |
| 4,741,154 | 5/1988 | Eidelman . |
| 5,036,809 | 8/1991 | Goodman . |
| 5,305,721 | 4/1994 | Burtis . |
| 5,399,078 | 3/1995 | Kuramasu . |
| 5,404,850 | 4/1995 | La Bell . |

FOREIGN PATENT DOCUMENTS

| | | | |
|---|---|---|---|
| 2448828 | 4/1976 | Germany ................................ | 123/230 |
| 3027208 | 10/1981 | Germany ................................ | 418/270 |

*Primary Examiner*—Michael Koczo

[57] ABSTRACT

While most rotary engines use the principle of volume variation between a curve and a moving cord of fixed length, this new engine concept uses a four degrees of freedom X, Y, θ, Φ rotor, confined inside an internal housing contour, and does not require a central shaft or support. The invention is an assembly of four carriages supporting the pivots of four pivoting blades forming a variable-shape rotor. This rotor rolls just like a roller bearing on the surface of an housing internal contour wall shaped like a skating rink. During the rotation, the rotor pivoting blades align alternatively in a lozenge and a square configuration. All ports are radial in the housing and/or axial on the lateral side covers. Since the compression and expansion strokes start and end simultaneously, an ignition flame transfer slot is used to maintain a continuous combustion while four strokes are completed in every rotation. A central shaft is not needed for the engine to operate, but can be added and driven by the blades, through a mechanical arms coupling. The device incorporates few parts, does not need a crankshaft or a flywheel, and can be made strong enough to meet the criteria of photo-detonation and direct hydrogen combustion.

21 Claims, 2 Drawing Sheets

QUASITURBINE ZERO VIBRATION-CONTINUOUS COMBUSTION ROTARY ENGINE COMPRESSOR OR PUMP

FIELD OF THE INVENTION

This invention relates generally to internal combustion engines and relates specifically to a rotary internal combustion engine having a four degrees of freedom rotor, confined into a calculated housing internal contour wall. As a perfectly balance device without crankshaft, this invention is a true rotary engine, by opposition to rotary piston engine. This device also relates to compressors, and pressure or vacuum pumps.

DESCRIPTION OF THE RELATED ART

Many rotary engine concepts have been proposed including a pressure energy converter, rotary engine or compressor as in U.S. Pat. Nos. 4,068,985, 3,996,899; a rotary disk engine as in U.S. Pat. No. 5,404,850; a rotary planetary motion engine as in U.S. Pat. No. 5,399,078; a rotary detonation engine as in U.S. Pat. No. 4,741,154; a rotary combustion engine as in DE Pat. No. 2,448,828, U.S. Pat. Nos. 3,933,131, 4,548,171, 5,036,809; the Wankel type engine as in U.S. Pat. Nos. 3,228,183, 4,308,002, 5,305,721, and a continuous combustion engine as in U.S. Pat. No. 3,996,899. Most rotary engines, and particularly the Wankel and those described in U.S. Pat. Nos. 3,442,257, 3,614,277, 4,144,866, 4,434,757, DE Pat. No. 3,027,208 are based on the principle of volume variation between a curve and a moving cord of fixed length as a sliding single piston-object. This invention does not use this principle, since the housing contour wall has four zones of maximum curvature, and the maximum volume as well as the compressed volume, are both located in a minimum curvature area.

OBJECTS AND SUMMARY OF THE INVENTION

The object of this invention is to provide a new engine concept making use of a four degrees of freedom rotor, confined inside an internal housing contour wall, constituting an hybrid piston-turbine engine where the rotor acts alternatively and similarly as a compressor turbine and a power turbine, unifying in one, both of the turbines in a conventional gas turbine engine.

An other object of this invention is to provide a low noise, perfectly balanced, zero vibration, low rpm engine, making use of a more efficient and less $NO_x$ productive asymmetric pressure cycle, giving less time to compression and exhaust stroke, and allowing more time and volume to the intake and combustion stroke.

A further object of this invention is to provide a fast accelerating, zero dead time engine, and to provide an engine almost universal in relation to energy sources, which can run efficiently on pneumatic, steam, hydraulic, liquid and gas fuel internal combustion, and due to its short pressure peak and cold intake area characteristics, is as well suitable for photo-detonation mode and pure hydrogen fuel combustion.

An other further object of this invention is to provide a high weight and volume density engine, compressor or pump, without need of any valve, check valve or obstruction, and with neither a crankshaft or a flywheel.

In order to achieve those objects, the present invention uses a four degrees of freedom rotor X, Y, θ, Φ, confined into a calculated housing internal contour wall, which does not require any central shaft or support for most applications. This concept has an optimum efficiency like the piston, because the maximum expansion volume at the end of each stroke is exactly equal to the volume generated by the movement of the tangential surface of push over a rotation.

The rotor is composed of four inter-linked pivoting blades, the pivoted ends of which are supported by a set of four carriages, free to rock on those same pivots. The assembly of the four blades and four carriages forms the rotor which is confined within the housing internal contour wall. Two plane side covers close the engine end. Intake, sparkplug and exhaust ports are made either radial in the housing, or axial in the side covers, or both.

Sealing with the side covers is effected by a system of linear and pellet type seals in contact with the plane side covers, and a spring loaded housing contour seal (apex) sitting on each carriage located in-between its set of wheels, and always perpendicular to the housing contour wall. The chamber is defined by two successive contour seals, and extend between the housing contour wall, and the related pivoting blade.

Rotation of the rotor bring successively the pivoting blades farther and closer of the housing contour wall, thus producing the compression needed by the engine, with possibility of very high compression ratio. Since there are four pivoting blades simultaneously involved in the four strokes cycle, this engine fires four times every revolution, with no dead time. The central engine area is empty, but can have a central shaft, linked to the four pivoting blades, or hold other devices such as an electric generator, a jet blades, a blower or a pump.

BRIEF DESCRIPTION OF THE DRAWINGS

A more complete appreciation of the invention will be readily apparent when considered in reference to the accompanying drawings wherein.

DETAILED DESCRIPTION OF THE PREFERRED EMBODIMENT

Figure 1:
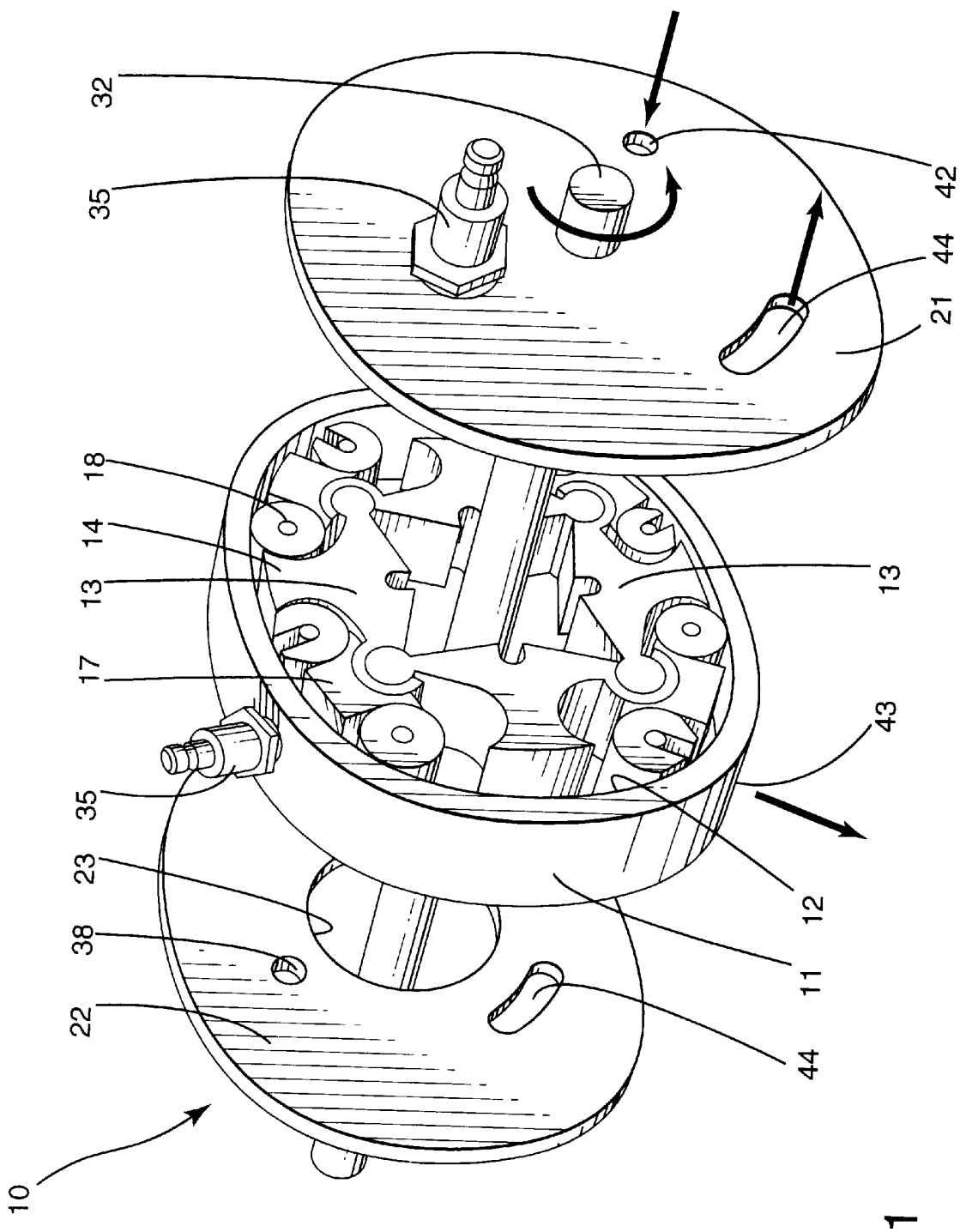
FIG. 1 is an exploded perspective view of a rotary internal combustion engine according to the present invention (seals not shown)

Referring to FIG. 1, an exemplary rotary internal combustion engine according to the present invention is shown and is designated generally by reference numeral 10. The rotary engine 10 includes a housing 11 with a particular internal contour wall 12 and two lateral plane covers, containing a rotor composed of four pivoting blades 13 and four rocking carriages 17 and wheel 18. Each pivoting blade 13 has a filler tip 14 and a traction slot 15, and their two ends pivots 16 sit on their respective rocking carriages 17.

Figure 2:
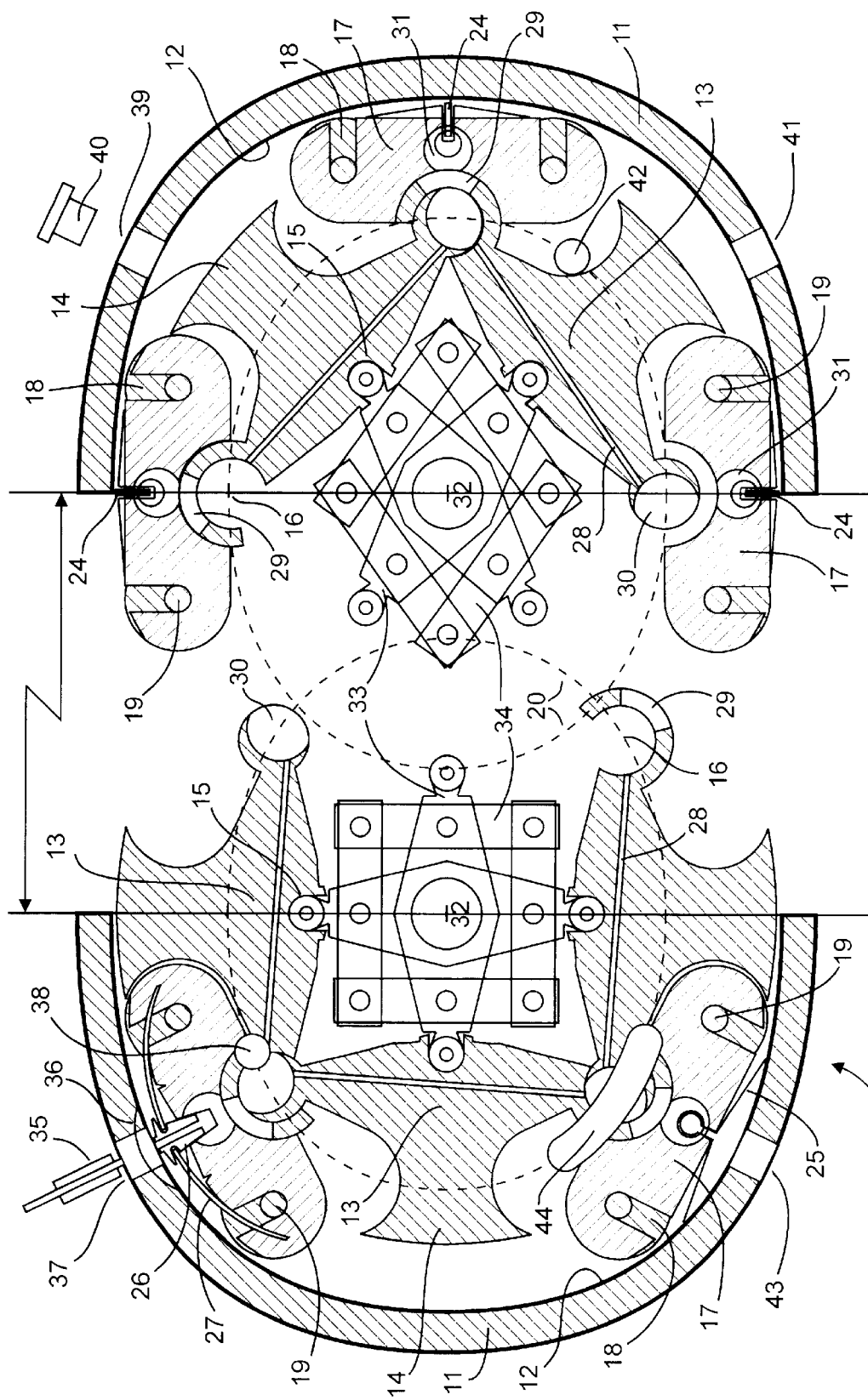
FIG. 2 is a longitudinal blow up sectional view for two different rotor angle positions, showing a square blades rotation arrangement on the left, and a lozenge arrangement on the right.

The basic geometry of the rotor is shown on the FIG. 2 blow up, for two different rotor angle positions. The rotor is composed of four (one more blade 13 is shown due to blow up) pivoting blades 13 playing a similar role as the pistons or turbine blades, one end of each pivoting blade having a hook pivot 16 and the other end a cylinder pivot 16. Each pivot 16 sits into one of the four rocking carriages 17 (one more carriage 17 is shown due to blow up). Each carriage 17 is free to rotate around the same pivot 16 in such a way as to be continuously and precisely in contact with the housing contour 12. Each rocking carriage 17 carries a housing contour seal of one of different design 24, 25, 26 midway between the wheel axes 19. The chamber is defined by two successive contour seals 24 or 25 or 26, and extends between the housing contour wall 12, and the related pivoting blade 13. There are four variable volume chambers forming two quasi-independent consecutive circuits, each producing a compression and an expansion stroke, which start and end simultaneously. In the four stroke engine operation, the first circuit is used to compress and to expand after combustion, the next circuit is used to expel the exhaust and to intake the air.

A central shaft 32 is not needed for the engine to operate. However a central shaft 32 can be driven through a set of coupling arms 33 as shown in FIG. 2, attached to the blades 13 by means of the traction slots 15 and through a set of arm braces 34, the ends of which are linked to the central shaft. Those link braces 34 are also useful to remove the RPM harmonic modulation on the shaft. Notice from FIGS. 1 and 2 that the central shaft assembly 32, 33, 34 is a sliding plug-in unit, easily removed through the back cover central hole 23 without dismantling the engine. In some applications, a central bearing attachment not shown is used to diminish the load pressure on the carriages 17 and against the opposite housing contour wall 12. When a central bearing is used, carriage wheels 18 can be replaced by rubbing pads since their role is then only to maintain the carriages 17 properly aligned for adequate contour seal 24, 25, 26 angle. No tensioning device has been proven necessary to keep all carriages 17 in good contact with the housing contour wall 12.

The assembly of carriage 17 and wheels 18 must be voluminous but not necessarily heavy, in order to fill a substantial volume in the chamber. Pivoting blades 13 are shaped with a filler tip 14 to allow the control of the residual volume in the upper and lower chambers at maximum pressure square configuration, as seen on FIGS. 1. and 2. left. The top of the filler tip 14 must be shorten such to permit an adequate compression ratio, and to insure that only a fraction of the gas is in the tiny interstices at the time of fire. Because the pressure pulse at top dead center is much shorter than in piston engine, the shape of the combustion chamber is much less critical. Carriage wheels 18 should be wide to reduce contact pressure with the contour wall 12. To distribute wear, the front and back wheels 18 of the same carriage 17 are positioned off line with overlapping paths. For smoother operation, roller bearing are inserted in the blade's 13 hooks pivot 16, to link friction free the cylindrical end of each pivoting blade 13 to the carriage 17 pivot surface.

A lateral seal for the low pressure applications is used on each side cover 21,22, and is made of a compression ring along the pivot 16 path 20. This quasi-elliptical seal is made of a slight deformation of a flexible metal sheet jacket (not shown). For high-pressure application, standard gate like linear seals 28 in the rotor blades 13 are provided. At pivots 16, the lateral sealing is assumed by a set of arc blade pellets 29, circular blade pellets 30, and carriage grooved pellets 31, all pressing against the side covers 21, 22. The large blade pellet 30 gains to have a hole (not shown) in the center to prevent pressure push back.

Spring loaded housing contour seals 24, 25, 26 of different possible designs are incorporated in a groove in the carriages 17 between the axes 19 of the two wheels 18 to insulate the chambers. Each housing contour seal 24, 25 26 sits on a rocking carriage 17 in such a manner as to be always perpendicular to the engine housing contour wall 12.

For intermediary pressure applications, a sliding gate type seal 24 is used. A butterfly type seal 25 suitable for low to moderate pressure applications is made of a stack of flat springs, which has the advantage of a minimal course during the rotation, but may be subject to excessive friction at high pressure. An advanced split contour seal 26 design suitable for very demanding applications uses a sloped groove in the carriage 17, and the internal chamber pressure to help maintaining itself in place at all time. This split contour seal design 26 uses the flat springs 27 anchored in the carriage 17 wheel area 18 also to oppose the tangential force. The split contour seal 26 contact point with the housing contour wall 12 is off the carriage 17 groove sloped plane for a positive pressure contribution.

For counter-clockwise rotation as a four strokes combustion engine, the four chambers are used in a sole circuit and the cycle is: intake, compression, expansion, exhaust. One of the left upper ports 37, 38 is fitted with a spark plug. The top right port 39 is closed with a removable plug 40. Ports 41, 42 are intakes from a conventional carburetor or must be fitted with a gas or diesel injector. Exhaust is expelled at ports 43, 44. In order to pass along the flame and make a continuous combustion engine, a small channel 36, located along the internal housing contour wall 12 next to the spark plug 35 at port 37, allows a voluntary flow back of hot gas into the next ready-to-fire combustion chamber when each of the contour seals 24, 25, 26 passes over 36. The amount of flow can be controlled by screwing or unscrewing the spark plug 35. This channel 36 is called the ignition transfer cavity or slot, and permits continuous combustion like in a turbine engine and in the same time generates a dynamically enhanced compression ratio in the almost ready-to-fire combustion chamber, allowing for a more complete and faster combustion. Furthermore, the four housing contour seals 24, 25, 26 are at variable distances during rotation, such as to permit an additional geometric volume pressure enhancement. The additional compression may lead to desirable or not photo detonation (kicking) and diesel pressure level when a diesel injector is located at spark plug 35 positions 37 and/or 38. In the ports 38 of the side cover 21, 22, the spark plug cavity is made large enough to withhold a small quantity of hot gas until the next ready to fire mixture comes up, which does allow for continuous combustion but without the dynamically enhanced compression ratio. Lateral ports 38, 42, 44 of the side cover 21, 22 offer better air-tight conditions while crossing in front of the ports due to the large carriage 17 lateral surface. An ignition timing advance can be built-in by slightly shifting the effective position of the spark plug 35 and/or the channel location 36. By blowing high pressurized air into the spark plug holes 37, 38 or into the ignition transfer cavity 36, the rotor accelerates until the self-starting point is reached. No synchronization of the sparks is required, and continuous high-frequency sparks or glow plug do. The exhaust in the side covers 21, 22 is progressive through a long arc port 44 which could allow, by flowing early exhaust through a standard Venturi, to produce a depression helping the late exhaust cleanup. This rotary engine 10 can also run as two parallel two strokes engine circuits, compression-expansion and compression-expansion, by blowing the exhaust with an intake mixture available from an external blower as in the conventional multi pistons two strokes engines.

As an additional feature, this rotary engine 10 requires few parts compared to a piston engine. Due to the continuous combustion and to its self-synchronized capability, this engine 10 is suitable for applications where high reliability is required. Average angular rotation speed of each pivot 16

(back and forth) of the pivoting blade 13 is about one third of the central shaft 32 RPM, while carriage wheels 18 rotate at 6 times the central shaft 32 RPM. This engine 10 central shaft 32 rotates at only a fraction of the maximum RPM of a piston engine except in detonation mode, with an idle under 200 RPM. Having a much better torque continuity than the piston engine, this engine 10 does require less flywheel effect and less gear box ratio for most applications.

To help cooling and reduce lubrication, at least one of the lateral side covers 21, 22 has a large central hole 23 exposing the pivoting blades 13 central area of the rotor such that all parts of the engine 10 are external, except for the carriage 17 and wheels 18 which are always in good thermal contact with the housing contour 12. A simple way to lubricate is to use a mixture of fuel and oil even in the four strokes engine mode, but more sophisticated applications could incorporate pressurized oil distribution systems. Since the seals are the only friction surfaces, the need of lubrication is minimized by an optimal choice of anti-friction materials.

Movement of the wheels 18 on the inner housing wall 12 allows for heat transfer and distribution to the whole housing 11. The pivoting blades 13 are cooled by lateral contact, and by ventilating wings (not shown) located toward the central engine area. Since this engine 10 does not have any oil pan or inactive room, it is suitable for operation in all orientations, and in submerged or hostile environments. Furthermore, due to the continuous combustion, this engine 10 can be used under water as a self contained pump or jet propulsion unit, or in electrically conductive environments.

In addition to the internal combustion engine, this engine 10 can be used as a compressed fluid pneumatic, steam, or hydraulic energy converter motor. The engine 10 then uses the two quasi independent symmetrical chamber circuits in parallel, with all port plugs 40 removed. For counter-clockwise rotation, intakes are housing ports 37, 41 and exits are ports 39, 43. Torque is generated symmetrically in the two opposed expansion chambers and adds up, and the rotor is almost self-starting. Except when ports are in the sides covers 21, 22, the direction of rotation can be reversed by reversing the direction of the flow. When used as a flow meter, the device 10 also works in both directions. Mechanically driven, this fluid energy converter motor 10 becomes a compressor, or a pressure or vacuum pump, with the same two quasi independent circuits working their own cycle. In compressor mode, this device 10 builds up pressure by adding four chamber volumes per revolution and per chamber circuit, without making use of a limiting check valve, providing that some temporary back flow is acceptable. Total pumped volume can reach up to 70% of the contour 12 volume per rotation. The housing 11, the pivoting blades 13, and the carriages 17 can be made of metal, glass, ceramic or plastic, the later mostly for compressor, pump or water hydraulic engine applications.

Calculation of the SAINT-HILAIRE's (from the name of the physicist who made the calculation) housing contour family of curves 12 is quite complex. To achieve the desired characteristics and to distribute stress and constraints on the housing 11, a proper selection of distances between wheel axes 19 (Distw), wheel diameter 18 (Dw) and carriage 17 height (H) must be made. At first it is not obvious that such a contour exists, particularly a monotone one without lobes, but it does in practice within an interesting range of the deformation parameters (P) defined as the ratio of the minimum lozenge diagonal (LDmin) to the maximum (LDmax). As the rotor rotates, pivoting blades 13 align in a square configuration as in FIG. 1 and in the left arrangement of FIG. 2, with the upper and lower chamber at top dead center. At that moment, the two upper and lower carriages 17 tend to align themselves almost horizontally. The carriages 17 angle (Gsq) with the horizon in the square configuration, determines whether or not the rotor will need a central bearing support to stabilize lateral motion. To avoid the central support, we have selected for the housing contour 12 shown in FIGS. 1 and 2, a deformation parameter (P) of 0.800, which leads to an angle Gsq of 28.00 degrees. For the current case (P=0.800), lozenge corner angle varies from 90.000+/−12.680 degrees.

A numerical spreadsheet application has been developed to calculate the contour family of curves. The method constrains the symmetry of the contour 12 only through the central housing axis and first calculates the profile (not a contour at this stage) of the centers of the carriage wheels 19. Calculations start with an approximate profile of the wheel 19 centers and calculate the profile 20 of the carriage pivots 16, which is imaged through the lozenge transformation into a quality control profile 20 of the pivots 16 about 90 degrees out of phase. Profile of the wheel centers 19 are then modified by Monte Carlo random perturbations method or convergent algorithm, until those two calculated profile 20 of the carriage pivots 16 and the profile 20 of quality control pivots 16 become identical and in coincidence. Close analytic mathematical match of the profile of the wheel centers 19 "cw" has been found to be of the following form, with three adjustable parameters (A, B, C):

$Xcw = A \cdot (H + LDmax/2) \cdot (1 - C \cdot ABS(\cos(Z))) \cdot \cos(Z)$; Polar: Angle=arctan($Ycw/Xcw$)

$Ycw = B \cdot (H + LDmin/2) \cdot \sin(Z)$; Radius=Sqrt($Xcw^2 + Ycw^2$)

Where Z is a generating angle, not the actual angle of the profile of the wheel centers 19 position. Error using this formula does not exceed 0.4%; a second order correction reduces this error by almost ten folds. Exact mathematical profiles do not exist except for some particular parameters selection. The length of the pivoting blade (Lz for lozenge side) is measured from the center of the cylindrical pivot 16 at one extremity to the center of the hook pivot 16 at the other. The following sets of parameter values, normalized to the pivoting blade 13 length (Lz), generate acceptable final profile of the wheel centers 19. Corresponding parameters values are given below for 3 values of the deformation P:

Lozenge deformation parameter P=(LDmin/LDmax):

|  | 0.800 | 0.750 | 0.700 |
|---|---|---|---|
| Lozenge side (Lz) pivot to pivot | 1.000 | 1.000 | 1.000 |
| Distance between carriage wheel (Distw) | 0.607 | 0.578 | 0.551 |
| Carriage wheel diameter (Dw) | 0.303 | 0.289 | 0.276 |
| Height of the carriage (H) | 0.152 | 0.144 | 0.138 |
| Square carriage angle (Gsq) | 28.00 | 22.62 | 16.72 |
| Lozenge corners angle: 90 degrees +/− | 12.68 | 16.26 | 20.01 |
| Larger final profile diameter | 2.258 | 2.245 | 2.231 |
| Smaller final profile diameter | 1.901 | 1.809 | 1.720 |
| Constant A | 1.048 | 1.036 | 1.022 |
| Constant B | 1.029 | 1.021 | 1.015 |
| Constant C | 0.422 | 0.586 | 0.778 |

For P<0.760, the profile 19 of the wheel centers and of the housing contour 12 start to show lobes. Those solutions are also mathematically acceptable, but do generate higher stress on the rotor. Housing contours 12 have also been calculated for two interesting limit cases:

a) instead of a carriage 17, only one wheel, centered at the pivots 16 of the pivoting blades 13 (distance between wheel axes Distw=0, and carriage height H=0); and b) no wheel at all, meaning that the pivot 16 of the pivoting blade 13 are rubbing on the housing contour wall 12 (additional constraint of wheel diameter Dw=0).

These configurations require in practice a central bearing support.

Final housing contour 12 is the profile of the wheel centers 19 enlarged by a wheel radius (Dw/2) all around, plus the thickness of any replaceable sleeve if used. The selection of an optimum contour is done for a high radius angular variation rate near top dead center, and such as the final expansion volume is near the volume generated by the movement of the variable tangential surface of push. Those wheel center 19 profiles and housing contours 12 generally look like a rounded corner parallelepiped with four zones of maximum curvature, or two lobes with six zones of maximum curvature at higher eccentricity, and contrary to vane devices these contours 12 allow for high-pressure ratio without any intake volume reduction.

We claim:

1. A rotary apparatus able to produce mechanical energy from pressurized fluids flow like hydraulic, steam, pneumatic, and internal combustion, or to pump, vacuum and compress, comprising:

A housing having an internal contour wall, including two planar side covers;

Four pivoting blades consecutively pivoted one to the other at their ends about parallel axes;

Four carriages external to, and pivoted on the ends of said pivoting blades, and carrying end parts in contact with said housing contour wall;

The assembly of said four pivoting blades and four carriages forming a four degrees of freedom X, Y, θ, Φ variable-shape rotor rolling inside said housing contour wall about a central axis;

Said rotor carrying filler tips;

A system of lateral seals in contact with the said side covers and a set of contour seals in contact with the said housing contour wall;

Four chambers of variable volume, each limited by two successive said contour seals, and extending in-between the said contour seals along the contour wall, and on the outward face of the said carriages, pivoting blade and filler tip;

A set of ports in the said housing and side covers for intakes and exhausts;

Wherein all consecutive compressions are occurring repetitively in the same housing areas, and all consecutive expansion are also occurring repetitively at a different intermediate housing areas;

Wherein the two compression housing areas are opposed, and alternate with the two as well opposed expansion housing areas;

Wherein successive compression strokes and expansion strokes start and end simultaneously;

Wherein the distance between two consecutive said contour seals increases and decreases during a revolution of the said rotor, such as to generate a geometric volume pressure enhancement.

2. A rotary apparatus as defined in claim 1, wherein the said housing contour wall is generally shaped like a rounded corner parallelepiped, with four areas of maximum curvature and four intermediate areas of minimum curvature.

3. A rotary apparatus as defined in claim 1, wherein to permit higher eccentricity to the said rotor, the calculated said contour wall is lobe shaped, with six areas of maximum curvature and six intermediate areas of minimum curvature.

4. A rotary apparatus as defined in claim 1, wherein the contour of the said contour wall is one of a family of curves, and the method for calculating those contours includes the following calculation steps:

Symmetry is constraint only about the central axis of the housing, which allows also acceptable mathematical solutions not symmetrical through the x- or y-axis;

Starting from an approximated empirical profile of the wheel centers on which the movement of a carriage generates a profile of the carriage pivots (which is not an housing contour yet at this stage);

Imaging this profile of the carriage pivots through the lozenge transformation generates a quality control profile of pivots about 90 degrees out of phase;

Adjusting the empirical profile of the wheel centers until the profile of the carriage pivots and the quality control profile of pivots become identical and in coincidence, by using a set of Monte Carlo random perturbations or convergent algorithm;

Final said housing contour is obtained by enlarging the said profile of wheel centers by one wheel radius all around;

For large eccentricity, some calculated profile of pivots and said contours show lobes, but are still acceptable;

For the limit case wherein the distance between the two said wheels of the same said carriage are set to zero and said wheel positioned at the said pivot, acceptable profiles are still obtained, even for a said wheel diameter equal to zero, Selection of an optimum said contour is done for high angular radius variation rate near top dead center, and such as the final said chamber expansion volume is near the volume generated by the movement of the tangential surface of push.

5. A rotary apparatus as defined in claim 1, wherein each pivoting blades comprises:

One hook at one end, and a cylinder at the other end, so that four pivoting blades can be firmly assembled together to allow with the carriages, a four degrees of freedom movement;

A roller bearing inserted in each said hook, linking friction free the cylindrical end of the pivoting blade to the carriage pivot surface; and Each said pivoting blade having a traction slot toward the central rotor area allowing to drive a central shaft attachment mechanism.

6. A rotary apparatus as defined in claim 1, further comprising:

A wheel in contact with the said contour wall at each end of the said carriage;

A central receptacle in the said carriage in-between the two said wheels, and in rocking contact with the outside of the said pivot; and An axial groove in said carriage to carry one of said contour seal, located on each said carriage at an equal distance of the said two wheels.

7. A rotary apparatus as defined in claim 1, wherein said filler tip is fixed to and extend outwardly forms the said pivoting blade between two consecutive carriages.

8. A rotary apparatus as defined in claim 1, wherein said filler tips are fixed to and extend outwardly forms the said two carriage ends pertaining to the pressure chamber.

9. A rotary apparatus as defined in claim 1, wherein said ports are radial housing ports for a spark plug, intake and exhaust, located near where the contour seals stand at top dead center.

10. A rotary apparatus as defined in claim 1, wherein said ports are lateral side cover ports for a spark plug, intake and exhaust, located on the pivoting blade pivots path, and near the blade pivot positions when at top dead center.

11. A rotary apparatus as defined in claim 1, comprising a set of said housing contour seal made as a spring loaded sliding gate type.

12. A rotary apparatus as defined in claim 1, comprising a set of said housing contour seal using a stack of flat springs held midway by a semi circular insert and called butterfly type, suitable for moderate pressure applications.

13. A rotary apparatus as defined in claim 1, comprising a set of said advanced split contour seal, using a carriage sloped groove and the internal chamber pressure to help maintaining the said seal in place at all time, and suitable for very demanding applications.

14. A rotary apparatus as defined in claim 1, having a system of said lateral seal carried by the said blades and carriages, comprising:

A linear seal on each side of the said pivoting blade;

An arc pellet seal on each side of the said hook end of each said pivoting blade;

A circular pellet seal on each side of the said cylindrical end of each said pivoting blade; and A carriage grooved pellet seal on each side of the said carriage around the said contour seal.

15. A rotary apparatus as defined in claim 1, wherein the said lateral seals include:

An arc pellet seal on each side of the said hook end of each said pivoting blade;

A carriage grooved pellet seal on each side of the said carriage around the said contour seal; and An almost elliptic static pressure ring on each of the side cover pivots path, which by design is in permanent contact with the rotor, for moderate pressure applications.

16. A rotary apparatus as defined in claim 1, comprising:

Several removable intake and exhaust plugs, which are used to convert the 2 parallel compression and expansion circuits into a sole serial circuit;

Two quasi independent circuits used in parallel with the plugs removed for operation as a two stroke rotary internal combustion engine, a fluid energy converter, a compressor, a vacuum pump and a flow meter; and Two quasi independent circuits used in serial by plugging intermediate ports, to make a four strokes internal combustion rotary engine.

17. A rotary apparatus as defined in claim 1, wherein:

The said carriage wheels are of cylindrical shape, and in direct mechanical contact with the said housing contour wall, thereby increasing the combustion chamber walls thermalization, heat transportation and dissipation; and At least one of the two side covers has a large central hole exposing the blades central area of the rotor, thus limiting the number of the internal parts to the carriages and their wheels, and so improving the cooling and reducing the need for lubrication.

18. A rotary apparatus as defined in claim 1, comprising:

A central shaft coaxial with the central housing axis, crossing the two side covers and supported by bearings in at least one of the side covers;

A central shaft coupling mechanism composed of at least two crossing arms attached to the said pivoting blades traction slots and to a set of moving arm braces, wherein the ends of said arm braces are linked to the central shaft;

Wherein the shaft coupling mechanism is made as a sliding plug-in unit, easily removed without dismantling the apparatus;

Wherein the shaft coupling mechanism contributes to remove the RPM harmonic modulation on the shaft; and Wherein the shaft gives full power takeoff at both of its ends.

19. A rotary apparatus as defined in claim 1, when used as internal combustion engine, having:

An ignition transfer slot cut into the housing contour wall, located where the forward carriage contour seal stand at maximum chamber pressure, such as to allow a flame transfer from one chamber to the next, and permitting continuous combustion;

The said ignition transfer slot allowing the injection of high pressure hot burning gas into the next ready to fire chamber, to produce a dynamically enhanced compression ratio.

20. A rotary apparatus as defined in claim 1, wherein when used as internal combustion engine, at least one side cover has a spark plug cavity made large enough to retain a small quantity of hot gas sufficient to alight the following ready to fire combustion chamber, whereas to make the engine in continuous combustion mode.

21. A rotary apparatus as defined in claim 1, wherein in engine mode:

The two facing intake said ports located one on each side of the engine are easily accessible to permit independent and stratified admission of fuel and air;

Said pivoting blades and carriages are made very strong; and

The intake chamber area is kept cold, such as to permit engine photo-detonation mode and direct hydrogen combustion.

* * * * *